Patented Sept. 30, 1947

2,428,015

UNITED STATES PATENT OFFICE 2,428,015

ESTERS OF VALEROLACTONE

Ralph Daniels and Harold Levy, New York, N. Y., assignors, by mesne assignments, to Burton T. Bush, Inc., a corporation of New Jersey No Drawing. Application February 25, 1946, Serial No. 650,126

6 Claims. (Cl. 260—344)

This invention relates to novel esters of valerolactone, and to a method for preparing them.

The structural formula of these new esters may be represented as follows:

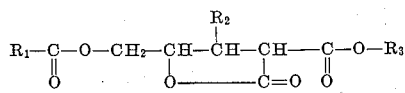

wherein $R_1$ and $R_3$ may be aliphatic and aromatic radicals, and $R_2$ may be H or $CH_3$.

The esters of this invention may be prepared by reacting a compound having the structural formula:

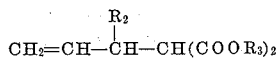

wherein $R_2$ and $R_3$ have the same meaning as above, with peracetic acid, or with other peracids, such as perbenzoic acid and perphthalic acid, the reaction taking place in the presence of a strong mineral acid, such as sulfuric acid or hydrochloric acid.

This invention is further illustrated by the following examples, which are intended for purposes of illustration and are not intended to be construed as limitations.

EXAMPLE I

Preparation of diethyl allylmalonate

A solution of sodium diethyl malonate was prepared in the usual manner from 34.5 grams (1.50 atoms) of sodium, 750 ml. of absolute ethanol, and 241 grams (1.51 mols) of diethyl malonate. To this solution was added allyl chloride (125.0 grams, 1.64 mols) during ¾ hour, with stirring and with no external heating or cooling. The reaction mixture was then refluxed 2 hours.

The mixture was concentrated in vacuo at about 15 mm., using a bath at about 55°–60° C., to remove most of the alcohol. The residue was cooled to room temperature and poured into 300 grams of an ice-water mixture. To this was added cold, 10% sulfuric acid until a definite acid reaction was achieved. The mixture was extracted with 7×100 ml. of ether and the ether extract washed successively with 100 ml. of cold, saturated sodium bicarbonate solution and 2×100 ml. of cold water. The washed ether solution was dried over anhydrous sodium sulfate, filtered, concentrated to remove ether, and the residue distilled. Two successive distillations through a Widmer column, containing a 250 mm. spiral, and Fenske-type column (625 mm. long, 10.5 mm. I. D., packed with 3 mm. glass helices, and arranged for total reflux and partial take-off) led to 164.6 grams (55% yield) of the diethyl allylmalonate, boiling point 117°–118° C. at 20 mm., $n_D^{25}$ 1.4278–1.4281.

EXAMPLE II

Preparation of alpha-carbethoxy delta-acetoxy gamma-valerolactone

A solution (46 ml.) of peracetic acid in acetic acid, containing 0.225 mol of the oxidant, was mixed with 100 ml. of acetic acid and 1 ml. of concentrated sulfuric acid. To this mixture was added, dropwise and with stirring, diethyl allylmalonate (15 grams, 0.075 mol) as prepared above. The addition was made, at first, at room temperature but mainly at about 50° C. The reaction mixture was further stirred at 50° C. for four and one half hours.

It was then concentrated in vacuo (bath at 40° C.). The residual liquid was poured into 50 ml. of ice and water and the mixture extracted with 3×75 ml. ether. The ether extract, after washing successively with cold, saturated solutions of sodium bicarbonate and sodium chloride, was found, on concentration, to contain some peroxide-like material. The ether solution was therefore washed with saturated sodium bisulfite (2×25 ml.) and again with bicarbonate and salt solutions. The washed solution was dried (anh. sodium sulfate), concentrated at atmospheric pressure and in vacuo and finally distilled, using a molecular pot still. A colorless distillate, 6.6 grams (38% yield) was obtained in five fractions at 0.02 mm. (bath 125° C.)–0.007 mm. (bath 190°), $n_D^{25}$ 1.4550–1.4559. A middle fraction had $n_D^{25}$ 1.4558 and $d_4^{25}$ 1.2117. This was the desired substance, having the structural formula:

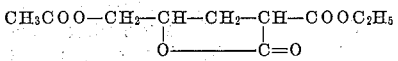

EXAMPLE III

Preparation of diethyl-(1-methyl-2-propenyl)-malonate 15.2 grams (0.168 mols) of 3-chloro-1-butene, $n_D^{20}$=1.4147–1.4148, were dissolved in 25 ml. of absolute ethanol. To this solution was added during 45 minutes a solution of sodium diethyl malonate, prepared in the usual manner from 3.8 grams (0.163 atom) of sodium, 150 cc. of absolute ethanol and 26.5 grams (0.165 mols) of diethyl malonate. The temperature was maintained at 20°–28° C. during the addition performed by pumping the sodium diethyl malonate from the vessel in which it was prepared into the reaction vessel under nitrogen gas pressure. The mixture was stirred for 45 minutes and allowed to stand at room temperature (about 25° C.) over night (16–17 hours). All of the foregoing operations were performed in the absence of atmospheric moisture, this condition being attained by means of tubes filled with, e. g., anhydrous calcium chloride, at all openings to the atmosphere.

The mixture was concentrated in vacuo (about 15 mm. mercury) to remove most of the ethanol by heating in a bath at 40°–50° C. The residue was cooled to room temperature (circa 20° C.) and 100 ml. of ice and water and then 10% sulfuric acid, bringing the pH to 6, were added. The acidified solution was extracted three times with ether (75 ml. of ether being used each time) and the combined ether extracts were washed successively with water (35 ml.), saturated sodium bicarbonate (50 ml.) and water (2×25 ml.).

The washed extract was dried over anhydrous sodium sulfate, filtered, concentrated to remove ether, and the residue was distilled.

The desired ester was obtained (10.2 grams) as a colorless liquid, boiling point 54° C. under 0.4 mm. mercury pressure to 56° C. under 0.25 mm. mercury pressure, $n_D^{25}=1.4305–1.4311$. Redistillation gave the pure compound, boiling point 61°–62° C. under 0.3 mm. mercury pressure, $n_D^{25}=1.4310$, $d_4^{25}=0.9894$, $M_D=56.06$.

EXAMPLE IV

*Preparation of alpha-carbethoxy beta-methyl delta-acetoxy gamma-valerolactone*

Diethyl (1-methyl-2-propenyl)-malonate (16.1 grams, 0.075 mol) prepared as above, was added during 20 minutes with stirring to 26.4 ml. of a solution of peracetic acid in acetic acid (containing 0.094 mol of oxidant) mixed with 5 drops of concentrated sulfuric acid. The contents of the flask were maintained at about 75° C. during the addition. Following this, the reaction mixture was heated at about 75° C. for 2 hours more.

It was then concentrated in vacuo at about 20 mm. (bath at about 40°–45° C.). The residual liquid was diluted with 100 ml. of ether, and the ether solution washed with 10 ml. of saturated sodium chloride solution. The salt solution wash was extracted with 75 ml. of ether, the ether solutions combined, and the latter washed successively with 10 ml. sodium bisulfite solution, 5 times with 15 ml. portions of saturated sodium bicarbonate, and twice with 15 ml. portions of salt solution. The washed ether solution was dried (anhydrous sodium sulfate), the ether distilled from the solution at atmospheric pressure, and the residual liquid heated for 1 hour at 60° C. at 0.8–0.1 mm. After this treatment the liquid weighed 14.3 grams (78% crude yield) and had $n_D^{25}$ 1.4532 and a saponification equivalent (S. E.) of 86.9.

This liquid was distilled, using a molecular pot still. The distillate consisted of 9.9 grams (54% yield) of colorless liquid, distilling at 0.004 mm. (bath 125° C.) to 0.005 mm. (bath 160° C.), $n_D^{25}$ 1.4527–1.4542. The main fraction had $n_D^{25}$ 1.4534, $d_4^{25}$ 1.1752 and was the desired material, having the formula:

$$CH_3-\underset{\underset{O}{\|}}{C}-O-CH_2-\underset{\underset{\underset{C=O}{|}}{O}}{CH}-CH-CH-COOC_2H_5$$

In similar manner, related esters wherein $R_1$ and $R_3$ are other alkyl and aryl radicals may be prepared, by employing, for example, dimethyl malonate (or dimethyl substituted malonate) or by using perbenzoic acid as the reactant.

The novel esters herein are useful as intermediates in the preparation of numerous organic compounds. Those wherein $R_2$ is $CH_3$ are especially suitable as intermediates in the preparation of biologically-active substances. In addition, the novel compounds lend themselves to use as plasticizers.

The foregoing illustrates the practice of this invention, which however, is not to be limited thereby but is to be construed as broadly as permissible in view of the prior art and limited solely by the appended claims.

We claim:

1. Compounds having the structural formula:

$$R_1-\underset{\underset{O}{\|}}{C}-O-CH_2-CH-\underset{\underset{\underset{C=O}{|}}{O}}{\overset{\overset{R_2}{|}}{C}H}-CH-\underset{\underset{O}{\|}}{C}-O-C_2H_5$$

wherein $R_1$ is a member selected from the group consisting of $CH_3$, $C_6H_5$, and

[benzene ring]—COOH and $R_2$ is a member selected from the group consisting of H and $CH_3$.

2. The compound having the structural formula:

$$CH_3-\underset{\underset{O}{\|}}{C}-O-CH_2-CH-CH_2-\underset{\underset{\underset{C=O}{|}}{O}}{CH}-\underset{\underset{O}{\|}}{C}-O-C_2H_5$$

3. The compound having the structural formula:

$$CH_3-\underset{\underset{O}{\|}}{C}-O-CH_2-CH-\underset{\underset{\underset{C=O}{|}}{O}}{\overset{\overset{CH_3}{|}}{C}H}-CH-\underset{\underset{O}{\|}}{C}-O-C_2H_5$$

4. The process for preparing compounds having the structural formula:

$$R_1-\underset{\underset{O}{\|}}{C}-O-CH_2-CH-\underset{\underset{\underset{C=O}{|}}{O}}{\overset{\overset{R_2}{|}}{C}H}-CH-\underset{\underset{O}{\|}}{C}-O-C_2H_5$$

wherein $R_1$ is a member selected from the group consisting of $CH_3$, $C_6H_5$ and

[benzene ring]—COOH and $R_2$ is a member selected from the group consisting of H and $CH_3$, which comprises reacting a compound having the structural formula:

$$CH_2=\overset{\overset{R_2}{|}}{C}H-CH-CH(COOC_2H_5)_2$$

with a member selected from the group consisting of peracetic acid, perbenzoic acid and perphthalic acid, the reaction being conducted in the presence of a strong mineral acid.

5. The process for preparing a compound having the structural formula:

$$CH_3-\underset{\underset{O}{\|}}{C}-O-CH_2-CH-CH_2-\underset{\underset{\underset{C=O}{|}}{O}}{CH}-\underset{\underset{O}{\|}}{C}-O-C_2H_5$$

which comprises reacting a compound having the structural formula:

$$CH_2=CH-CH_2-CH(COOC_2H_5)_2$$

with peracetic acid, the reaction being conducted in the presence of sulfuric acid.

6. The process for preparing a compound having the structural formula:

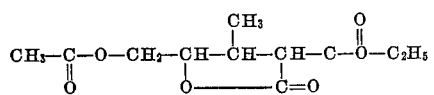

which comprises reacting a compound having the structural formula:

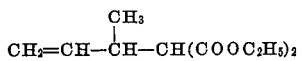

with peracetic acid, the reaction being conducted in the presence of sulfuric acid.

RALPH DANIELS.
HAROLD LEVY.

REFERENCES CITED

The following references are of record in the file of this patent:

UNITED STATES PATENTS

| Number | Name | Date |
|---|---|---|
| 2,364,358 | Hasche | Dec. 5, 1944 |

OTHER REFERENCES

Bielstein XVIII, 484.